CAIN & STELFOX.
Cultivator.
No. {1,464, 32,468,}          Patented June 4, 1861.
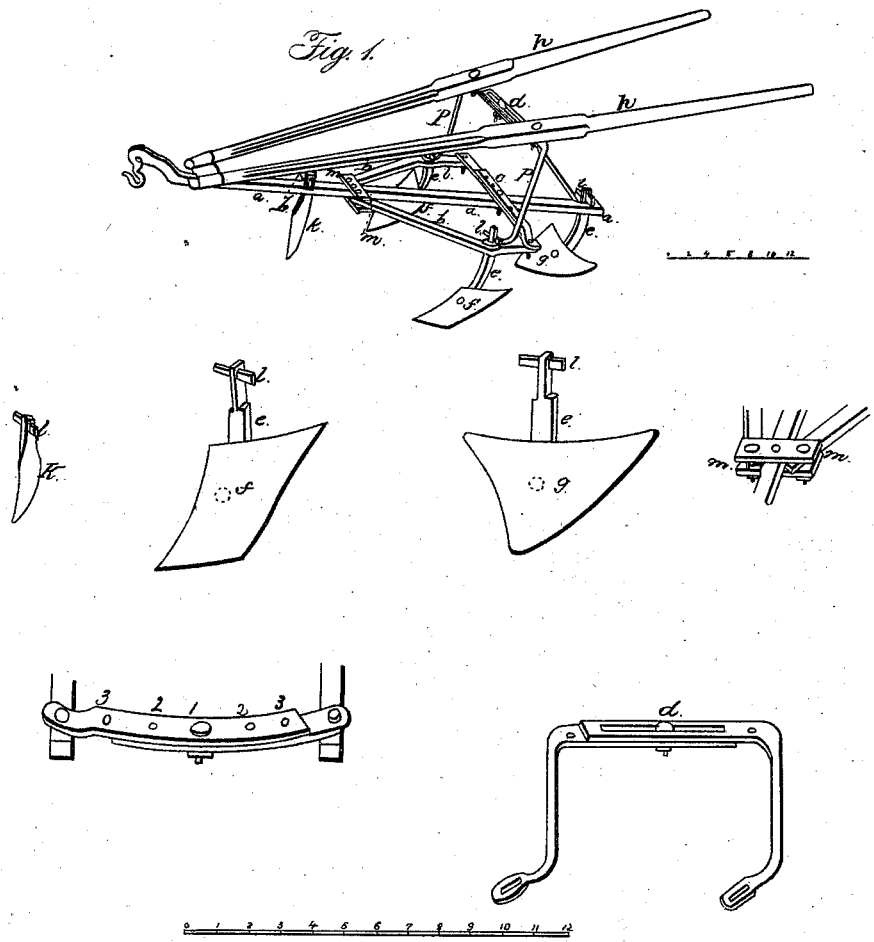
Witnesses:
Inventor:
Seth Cain
William Stelfox

UNITED STATES PATENT OFFICE.

SHUGAR M. CAIN AND WM. STELFOX, OF AUSTIN, TEXAS.

IMPROVEMENT IN CULTIVATORS.

Specification forming part of Letters Patent No. 32,468, dated June 4, 1861.

*To all whom it may concern:*

Be it known that we, SHUGAR M. CAIN and WILLIAM STELFOX, of Austin city, in the county of Travis and State of Texas, have invented a new and useful Machine for the Cultivation of Cotton and Corn, &c., known and called "The Texas Cultivator;" and we do hereby declare that the following is a full, clear, and exact description of the construction and operation of the same, reference being had to the annexed and accompanying drawing, making a part of this specification, in which—

Figure 1 is a perspective view.

Letters $a\ a\ a$ represent the main shaft; letters $b\ b$, the right and left wings; letters $h\ h$, the handles; letter $c$, the lower slide-regulator; letter $d$, the upper slide-regulator; letters $e\ e\ e$, the shanks to which the plows are attached; letters $ff$, the diamond plows; letter $g$, the sweep; letter $k$, the crescent colter; letters $l\ l\ l$, the keys by which the plows are attached to frame or stock; letters $m\ m$, the wing-hinges; letters $o\ o$, sockets by which handles are attached to main shaft; letters P P, uprights extending from wings up to point of junction of handles with upper slide-regulator, and forming the base of upper slide-regulator and sustainers of handles.

The nature and character of our invention, with its mode of operation and construction, are as follows: The diamond plows $ff$ are attached to the wings by means of shanks and keys $e\ e$ and $l\ l$, as in Fig. 1. The crescent colter $k$ and sweep $g$ are attached to main shaft $a\ a$. The handles $h\ h$ are attached to main shaft in sockets $o\ o$ and to upper slide-regulator, $d$, and supported by the bases or uprights P P of upper slide-regulator. The uprights P P are fastened to the wings of stock by means of the shanks of the diamond plows $ff$, the shanks being fastened by keys $l\ l$ to wings $b\ b$, the whole of the frame or stock to be of wrought-iron, except the handles $h\ h$, which are to be of wood, the crescent colter, diamond plows, and sweep to be made of best steel, the parts, when so attached and constructed, to be regulated in size and distance according to the scale upon sketch-map. The slide-regulators $d$ and $c$ will enable the operator to place the diamond plows at any desired distance apart, and the sweep $g$ will plow the unplowed ground between the furrows of the diamond plows, so that a row of any given width from three to five feet may be broken or plowed out by one trip up or down the row. The operator, by detaching the sweep $g$ and the crescent colter $k$ from the main shaft $a\ a$, will be able to run at one and the same time a diamond plow on each side of a row of cotton or corn, or other produce planted in row or drill, so that the soil, if desired, can, by an exchange of the left diamond plow to the right side of stock, and, vice versa, the right diamond plow to left side, be thrown from the row. By moving the lower slide-regulator, $c$, so that the hole 1 will be brought to the hole 3, and by moving the right wing a corresponding distance, so that the right wing will be extended as much from its ordinary position as the left wing approximates to the shaft by bringing said hole 1 to the location of the bolt at hole 3, then the diamond plows will still occupy the same distance from each other as before the removal of the left wing to a nearer place to main shaft and the right wing to a more remote position; and the consequence will be that the horse or power attached to the main shaft at $s$ will be able to walk on the left side of the row of cotton or corn or other produce, while the diamond plows will run at an equidistant space on each side of the row, thus at once hilling up or barring off both sides of the row at same time, thus enabling one operator and one team to perform the work which two operators and two teams are required to perform in same length of time, it being understood that the upper slide-regulator is to be adjusted conformably to lower slide-regulator.

What we claim as our invention, and desire to secure by Letters Patent, is—

The arrangement of the diamond plows $ff$, the crescent colter $k$, sweep $g$, wing-hinges $m\ m$, wings $b\ b$, slides $c$ and $d$, beam $a$, and handles $h$, as described, for the purposes set forth.

S. M. CAIN.
WM. STELFOX.

Witnesses:
  JAS. B. MORRIS,
  R. W. HARNBY.